US011586750B2

(12) United States Patent
Lombardi et al.

(10) Patent No.: US 11,586,750 B2
(45) Date of Patent: Feb. 21, 2023

(54) MANAGING ACCESS TO PROTECTED DATA FILE CONTENT

(71) Applicant: BlackBerry Limited, Waterloo (CA)

(72) Inventors: Robert Joseph Lombardi, Hamilton (CA); Neil Patrick Adams, Waterloo (CA); Jasmin Mulaosmanovic, Kitchener (CA)

(73) Assignee: BlackBerry Limited, Waterloo (CA)

( * ) Notice: Subject to any disclaimer, the term of this patent is extended or adjusted under 35 U.S.C. 154(b) by 554 days.

(21) Appl. No.: 16/360,165

(22) Filed: Mar. 21, 2019

(65) Prior Publication Data

US 2020/0302073 A1    Sep. 24, 2020

(51) Int. Cl.
*G06F 21/62* (2013.01)

(52) U.S. Cl.
CPC ............................ *G06F 21/6218* (2013.01)

(58) Field of Classification Search
CPC .................................................. G06F 21/6218
USPC ........................................................... 726/28
See application file for complete search history.

(56) References Cited

U.S. PATENT DOCUMENTS

| | | | |
|---|---|---|---|
| 6,470,450 B1 | 10/2002 | Langford et al. | |
| 7,197,638 B1 * | 3/2007 | Grawrock | G06F 21/6218 726/30 |
| 7,484,245 B1 * | 1/2009 | Friedman | G06F 21/62 726/28 |
| 7,660,902 B2 | 2/2010 | Graham et al. | |
| 8,312,064 B1 * | 11/2012 | Gauvin | G06F 21/6218 707/822 |
| 8,498,941 B2 * | 7/2013 | Felsher | G06F 21/6245 705/51 |
| 8,799,994 B2 * | 8/2014 | Barton | H04L 67/10 726/1 |

(Continued)

FOREIGN PATENT DOCUMENTS

| | | | |
|---|---|---|---|
| CN | 106778227 A | * | 5/2017 |
| EP | 1533676 | | 5/2005 |

(Continued)

OTHER PUBLICATIONS

Schäfer, Matthias, Martin Strohmeier, Vincent Lenders, Ivan Martinovic, and Matthias Wilhelm. "Bringing up OpenSky: A large-scale ADS-B sensor network for research." In IPSN-14 Proceedings of the 13th International Symposium on Information Processing in Sensor Networks, pp. 83-94. IEEE, 2014. (Year: 2014).*

(Continued)

*Primary Examiner* — Luu T Pham
*Assistant Examiner* — Walter J Malinowski
(74) *Attorney, Agent, or Firm* — Rowand LLP

(57) ABSTRACT

A method of managing access to protected file content is disclosed. The method includes: receiving a request to open a first file stored on the computing device; determining that the first file is a protected file; in response to determining that the first file is a protected file: identifying a first application that is suitable for opening the first file; determining that the first application is an unsecured application; and in response to determining that the first application is an unsecured application, locking the first application to prevent unauthorized access of application data of the first application in a locked state.

12 Claims, 4 Drawing Sheets

(56) References Cited

U.S. PATENT DOCUMENTS

| | | | |
|---|---|---|---|
| 8,881,229 B2* | 11/2014 | Barton | H04W 12/30 726/1 |
| 8,914,900 B2 | 12/2014 | Smith et al. | |
| 9,076,008 B1 | 7/2015 | Moy | |
| 9,191,376 B2* | 11/2015 | Phillips, II | H04L 9/3213 |
| 9,400,801 B1* | 7/2016 | Aplemakh | G06F 16/183 |
| 9,521,147 B2* | 12/2016 | Barton | G06F 21/6218 |
| 9,716,724 B1* | 7/2017 | Chennuru | H04L 63/08 |
| 10,402,546 B1* | 9/2019 | Qureshi | H04L 9/0822 |
| 10,445,516 B1* | 10/2019 | Mao | G06F 21/577 |
| 10,643,414 B2* | 5/2020 | Davis | H04W 12/08 |
| 2002/0033838 A1* | 3/2002 | Krueger | G06F 9/44521 707/999.2 |
| 2004/0054674 A1 | 3/2004 | Carpenter et al. | |
| 2004/0059946 A1* | 3/2004 | Price | H04L 63/105 726/1 |
| 2004/0111608 A1* | 6/2004 | Oom Temudo de Castro | H04L 63/0823 713/156 |
| 2005/0114672 A1 | 5/2005 | Duncan et al. | |
| 2005/0288961 A1* | 12/2005 | Tabrizi | G06Q 10/00 717/126 |
| 2007/0136207 A1* | 6/2007 | Davydov | G06F 21/10 705/57 |
| 2007/0245409 A1* | 10/2007 | Harris | H04L 67/34 726/5 |
| 2008/0263630 A1 | 10/2008 | Harada et al. | |
| 2008/0295174 A1 | 11/2008 | Fahmy et al. | |
| 2009/0100529 A1* | 4/2009 | Livnat | G06F 21/6209 726/28 |
| 2009/0276860 A1 | 11/2009 | Miyabashi et al. | |
| 2010/0211613 A1* | 8/2010 | Becker | G06F 21/6218 707/803 |
| 2011/0246753 A1* | 10/2011 | Thomas | H04L 63/107 713/1 |
| 2011/0321153 A1* | 12/2011 | Stoev | G06F 21/6218 726/16 |
| 2012/0054744 A1* | 3/2012 | Singh | G06F 21/6218 718/1 |
| 2013/0042295 A1* | 2/2013 | Kelly | H04W 12/082 726/1 |
| 2013/0080773 A1 | 3/2013 | Lu et al. | |
| 2013/0185816 A1* | 7/2013 | Maeda | G06F 21/604 726/30 |
| 2013/0346450 A1* | 12/2013 | Procopio | H04L 67/34 707/783 |
| 2014/0033271 A1* | 1/2014 | Barton | H04W 12/64 726/1 |
| 2014/0108792 A1* | 4/2014 | Borzycki | H04L 67/34 713/165 |
| 2014/0181518 A1 | 6/2014 | Kim et al. | |
| 2014/0279116 A1* | 9/2014 | Vasquez | G06F 21/44 705/21 |
| 2015/0079943 A1* | 3/2015 | Williams | H04W 12/08 455/411 |
| 2015/0200948 A1 | 7/2015 | Cairns et al. | |
| 2015/0347209 A1* | 12/2015 | Lyubinin | G06F 9/485 719/313 |
| 2015/0350338 A1* | 12/2015 | Barnett | H04L 67/143 709/203 |
| 2015/0358357 A1* | 12/2015 | Diaz-Tellez | H04W 12/37 726/27 |
| 2016/0065571 A1* | 3/2016 | Hoyos | H04L 63/0428 713/168 |
| 2016/0078245 A1* | 3/2016 | Amarendran | H04L 63/0428 713/193 |
| 2016/0092176 A1* | 3/2016 | Straub | G06F 8/38 717/107 |
| 2016/0308738 A1* | 10/2016 | Sinibaldi | H04L 67/2804 |
| 2016/0378685 A1* | 12/2016 | Spurlock | G06F 21/6218 711/163 |
| 2017/0039376 A1 | 2/2017 | Skipper et al. | |
| 2017/0091469 A1* | 3/2017 | Leemet | G06F 16/116 |
| 2017/0185790 A1 | 6/2017 | Gauda | |
| 2018/0203995 A1* | 7/2018 | Yuen | G06F 21/51 |
| 2018/0247483 A1* | 8/2018 | Lindsay | G07F 7/1008 |
| 2020/0045047 A1* | 2/2020 | Wu | H04L 69/169 |
| 2020/0099738 A1* | 3/2020 | Borkar | H04L 67/025 |
| 2020/0175208 A1* | 6/2020 | Yu | G06F 21/74 |
| 2020/0242256 A1* | 7/2020 | Kaczynski | H04L 9/088 |
| 2020/0394286 A1* | 12/2020 | Ewanchuk | G06F 9/451 |

FOREIGN PATENT DOCUMENTS

| | | | |
|---|---|---|---|
| EP | 2495677 A1 * | 9/2012 | G06F 21/31 |
| EP | 3422236 B1 * | 6/2022 | G06F 21/335 |
| WO | WO-2014084967 A1 * | 6/2014 | G06F 21/00 |

OTHER PUBLICATIONS

Datta, Trisha, and Kyriakos Manousakis. "Using SVM for user profiling for autonomous smartphone authentication." In 2015 IEEE MIT Undergraduate Research Technology Conference (URTC), pp. 1-5. IEEE, 2015. (Year: 2015).*

Rubin, Yoav, Nili Guy, Gal Shachor, Samuel Kallner, and Idan Ben-Harrush. "Puremeap—a mobile enterprise application platform: a bird's-eye view of the software architecture." In Proceedings of the 2013 ACM workshop on Mobile development lifecycle, pp. 17-18. 2013. (Year: 2013).*

Aris, Hazleen, and Wira Firdaus Yaakob. "Shoulder surf resistant screen locking for smartphones: A review of fifty non-biometric methods." In 2018 IEEE Conference on Application, Information and Network Security (AINS), pp. 7-14. IEEE, 2018. (Year: 2018).*

Park, Jin Hyung, Seok-Man Yoo, In Seok Kim, and Dong Hoon Lee. "Security architecture for a secure database on android." IEEE Access 6 (2018): 11482-11501. (Year: 2018).*

Shabtai, Asaf, Yuval Fledel, Uri Kanonov, Yuval Elovici, and Shiomi Dolev. "Google android: A state-of-the-art review of security mechanisms." arXiv preprint arXiv:0912.5101 (2009). (Year: 2009).*

Force, G. "Portable data encryption approaches." In Proceedings of WESCON'95, p. 413. IEEE, 1995. (Year: 1995).*

PCT International Search Report and Written Opinion relating to application No. PCT/CA2020/050313 dated Jun. 18, 2020.

Extended European Search Report, Application No. 20772692.8 dated Apr. 7, 2022.

* cited by examiner

MANAGING ACCESS TO PROTECTED DATA FILE CONTENT

TECHNICAL FIELD

The present disclosure relates to data security and, in particular, to managing access to protected file content on computing devices.

BACKGROUND

Modern computing devices support various types of applications. In addition to applications that are pre-installed on their devices, users may download third-party software to enable a wide range of functionalities. Each third-party software has its own policy for handling different aspects of application behavior such as, for example, mobile data usage, payment processing, network connection settings, and cache data management.

Users may store sensitive data on their computing devices that they wish to keep private to themselves or accessible to a limited number of authorized parties. Safekeeping of data on a computing device can often be challenging. In particular, divergent policies of third-party software installed on a computing device may pose difficulties for secure management of private user data.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
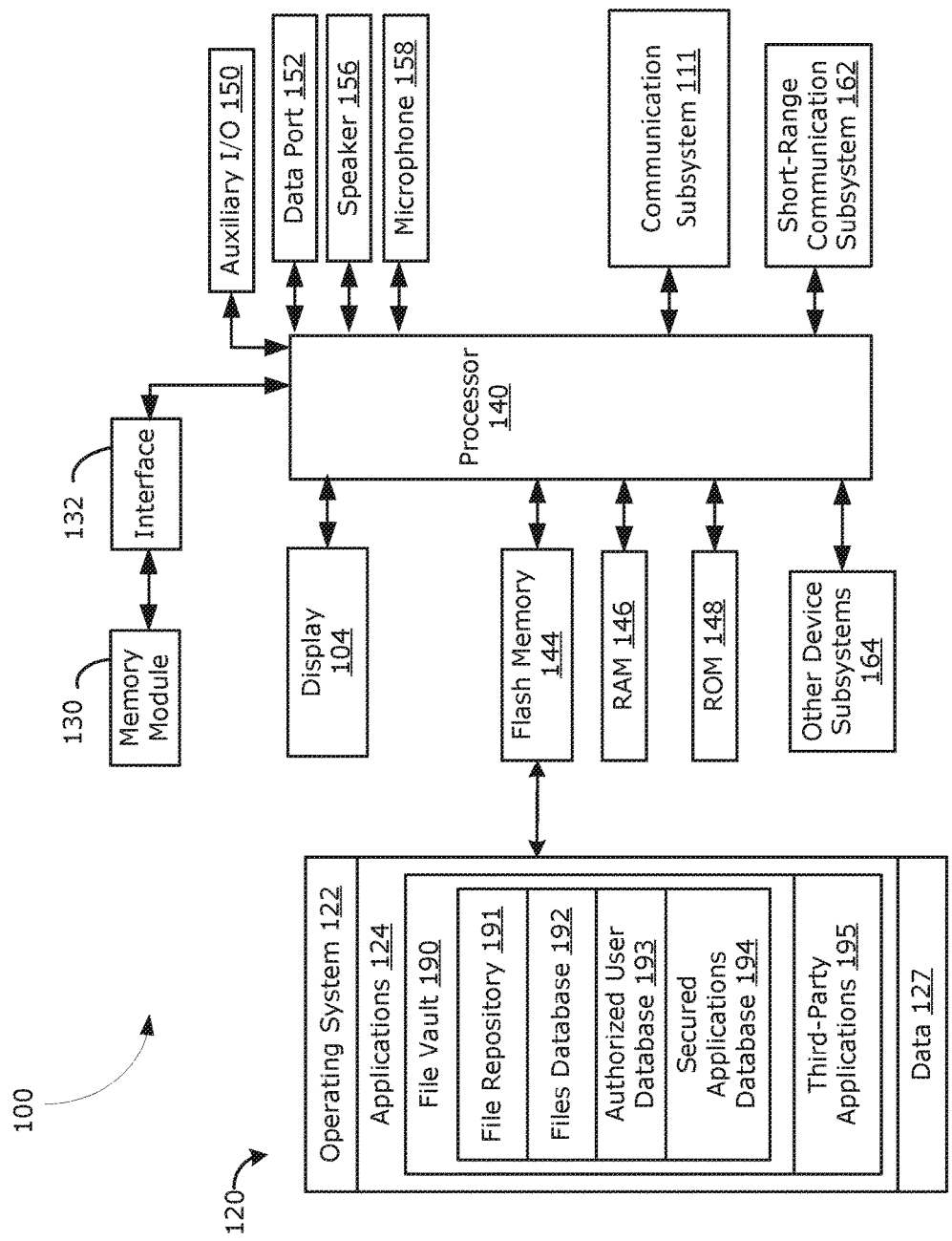
FIG. 1 is a block diagram illustrating components of an example computing device.

In one aspect, the present disclosure describes a method for managing access to protected file content. The method includes: receiving a request to open a file stored on the computing device; determining that the file is a protected file; in response to determining that the file is a protected file: identifying a first application that is suitable for opening the file; determining that the first application is an unsecured application; and in response to determining that the first application is an unsecured application, locking the first application to prevent unauthorized access of application data of the first application in a locked state.

In another aspect, the present disclosure describes a computing device. The computing device includes an input interface, a memory, and a processor coupled to the input interface and the memory. The processor is configured to: receive a request to open a file stored on the computing device; determine that the file is a protected file; in response to determining that the file is a protected file: identify a first application that is suitable for opening the file; determine that the first application is an unsecured application; and in response to determining that the first application is an unsecured application, lock the first application to prevent unauthorized access of application data of the first application in a locked state.

Other example embodiments of the present disclosure will be apparent to those of ordinary skill in the art from a review of the following detailed descriptions in conjunction with the drawings.

In the present application, the term "file vault" is intended to broadly encompass software, such as an application or utility, which may be used to store and/or manage one or more data files on a computing device. A file vault may be configured to regulate access to "protected" files on a computing device. A data file (e.g. media file, such as photo, video, musical recording, etc.) may be referred to as a protected file if it is intended to be kept private, i.e. accessible to only a limited number of authorized parties. A file may be designated as protected by, for example, setting metadata for the file to indicate "protected" status, saving the file in a file vault, or adding file information for the file in a protected files database.

A file vault may be used to enforce security policies relating to user access of protected files on a computing device. For example, users may access content of protected files that are stored in a file vault only upon authentication to the file vault. In particular, the file vault may prohibit unauthorized access of content of protected files. Authorized users can gain access to protected files by providing their authentication credentials to the file vault directly or to a separate application which manages requests to access the file vault.

A file vault implementation on a computing device may represent a data storage, or repository, for one or more protected files. Users may create or obtain files and save them in a file vault, thereby restricting access to the files. Alternatively or additionally, a file vault may be an application for performing various operations, such as opening, editing, saving, etc., with respect to the content of protected files. For example, a file vault may be set as the default application for opening files that are stored in the file vault. More generally, a file vault may be configured to manage access permissions for protected files, regardless of where those files are stored in memory. That is, files that are designated as "protected" and not saved in a file vault may still be managed using the file vault.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A computing device may store data files that are intended to be kept private or "protected", i.e. accessible only by authorized users. These protected files may be of different types or formats, and various different applications on the computing device may be suitable for opening such files. In particular, third-party applications—software that is provided by third-party developers—may be used to access the content of protected files. As a consequence, users of the computing device may not have complete control over some of the behavior and policies of the applications that are used to interact with protected files.

For example, the behavior of certain applications in handling cached data may be beyond users' control. Some applications may cache file data as part of the application's data. When a third-party application is used to open a file, the application may temporarily store the file and/or information about the file as cached data. For certain third-party applications, users may not be able to limit access of the cached file data during subsequent uses of the applications. This lack of control over access to cached file data can be a security risk, and may result in users unwittingly exposing content of protected files when using third-party applications.

The present disclosure provides methods for managing access to protected file content on a computing device. In one aspect, the present application describes a file vault which is configured to securely store and/or manage access permissions for protected files. The file vault may, for example, be an application or system utility for regulating user access to applications that are used to open one or more protected files. Upon receiving a user request to access a protected file, the file vault may select a suitable application for opening the file and determine whether the selected application is secure. If the selected application is an unsecured application, the file vault may lock the selected application to prevent unauthorized subsequent access of the application. In this way, the file vault may ensure that application data, including cached file data for any protected files, is not made available to users that do not have access permissions for the protected files.

Reference is first made to FIG. 1, which illustrates a block diagram of an example computing device 100. In an example embodiment, the computing device 100 may be a mobile communication device. The mobile communication device may be configured for two-way communication, having data and optionally voice communication capabilities, and the capability to communicate with other computer systems, e.g. via the internet. In other embodiments, the computing device 100 may take other forms, such as smartwatches, computers, tablets, laptops, or any other electronic device configured for connection over wireless networks.

The computing device 100 of FIG. 1 includes a housing (not shown) which houses components of the computing device 100. Internal components of the computing device 100 may be constructed on a printed circuit board (PCB). The computing device 100 includes a controller including at least one processor 140 (such as a microprocessor) which controls the overall operation of the computing device 100. The processor 140 interacts with device subsystems, such as a wireless communication subsystem 111, for exchanging radio frequency signals with a wireless network to perform communication functions. The processor 140 interacts with additional device subsystems including one or more input interfaces (which may include, without limitation any of the following: a keyboard, one or more control buttons, one or more microphones 158, a gesture sensor, and/or a touch-sensitive overlay associated with a touchscreen display), flash memory 144, random access memory (RAM) 146, read only memory (ROM) 148, auxiliary input/output (I/O) subsystems 150, a data port 152 (which may be a serial data port, such as a Universal Serial Bus (USB) data port), one or more output interfaces (such as a display 104), one or more speakers 156, or other output interfaces), a short-range communication subsystem 162, and other device subsystems generally designated as 164.

In some example embodiments, the auxiliary input/output (I/O) subsystems 150 may include an external communication link or interface, for example, an Ethernet connection. The communication subsystem 111 may include other wireless communication interfaces for communicating with other types of wireless networks, e.g. Wi-Fi networks.

In some example embodiments, the computing device 100 also includes a removable memory module 130 (typically including flash memory) and a memory module interface 132. Network access may be associated with a subscriber or user of the computing device 100 via the memory module 130, which may be a Subscriber Identity Module (SIM) card for use in a GSM network or other type of memory module for use in the relevant wireless network type. The memory module 130 may be inserted in or connected to the memory module interface 132 of the computing device 100.

The computing device 100 may store data 127 in an erasable persistent memory, which in one example embodiment is the flash memory 144. In various example embodiments, the data 127 may include service data having information required by the computing device 100 to establish and maintain communication with the wireless network. The data 127 may also include user application data such as messages (e.g. emails, text messages, multimedia messages, etc.), address book and contact information, calendar and schedule information, notepad documents, image files, and other commonly stored user information stored on the computing device 100 by its users, and other data.

The data 127 stored in the persistent memory (e.g. flash memory 144) of the computing device 100 may be organized, at least partially, into a number of databases or data stores each containing data items of the same data type or associated with the same application. For example, email messages, contact records, and task items may be stored in individual databases within the computing device 100 memory.

The short-range communication subsystem 162 is an additional optional component which provides for communication between the computing device 100 and different systems or devices, which need not necessarily be similar devices. For example, the short-range communication subsystem 162 may include an infrared device and associated circuits and components, a wireless bus protocol compliant communication mechanism such as a Bluetooth® communication module to provide for communication with similarly-enabled systems and devices, and/or a near-field communication (NFC) interface.

A set of applications that control basic device operations, including data and possibly voice communication applications may be installed on the computing device 100 during or after manufacture. Additional applications and/or upgrades to an operating system 122 or software applications 124 may also be loaded onto the computing device 100 through the wireless network, the auxiliary I/O subsystem 150, the data port 152, the short-range communication subsystem 162, or other suitable device subsystems 164. The downloaded programs or code modules may be permanently installed; for example, written into the program memory (e.g. the flash memory 144), or written into and executed from the RAM 146 for execution by the processor 140 at runtime.

The processor 140 operates under stored program control and executes software modules 120 stored in memory such as persistent memory, e.g. in the flash memory 144. As illustrated in FIG. 1, the software modules 120 may include operating system software 122 and one or more applications 124 or modules such as, for example, a file vault 190. In the example embodiment of FIG. 1, the file vault 190 is illustrated as being implemented as a stand-alone application, but in other example embodiments, a file vault may be implemented as part of system security utilities or services of the operating system 122. For example, the features of a file vault may be integrated into an applications manager for the operating system 122.

The file vault 190 may store one or more protected files. In particular, the file vault 190 may implement a file repository 191 for storing protected files. In at least some embodiments, the file vault 190 may provide a functionality for adding existing files to the file repository 191. For example, a graphical user interface (GUI) for the file vault 190 may include user interface elements associated with options, such as file upload, drag-and-drop, etc., for moving existing files that are stored elsewhere in memory of the computing device 100 to the file repository 191. The file vault 190 may additionally allow new files to be created from within the file vault 190. For example, the file vault 190 may include a functionality for creating new files (e.g. text document). Any new files that are created using the file vault 190 may be classified as "protected" and saved to the file repository 191.

The file vault 190 may additionally store data associated with one or more protected files on the computing device 100. In particular, the file vault 190 may implement a files database 192 that is configured to store data corresponding to one or more protected files. The files database 192 may contain file information for one or more existing files. An existing file may be added to the files database 192 by entering its file information into the database. For example, a user can manually enter information for a file using the file vault 190 to cause the file to be added to the files database 192.

More generally, the file vault 190 may be configured such that files having a certain property are automatically added to the files database 192. For example, file information for files on the computing device 100 that are identified as "protected" may be automatically added to the files database 192. Thus, a user may cause a file to be added to the files database 192 by setting or editing the properties of a file to indicate the file's status as a protected file. A user may, for example, modify the file metadata for a file to indicate a protected file status. The files that are added to the files database 192 are associated with the file vault 190. For example, the file vault 190 may be set as the default application for opening the files in the files database 192.

In at least some embodiments, file records containing information associated with protected files may be created and saved in the files database 192. For example, file records may be created in the files database 192 for one or more protected files that are stored in the file repository 191 or elsewhere in memory of the computing device 100. A file record may specify file information such as, for example, a file identifier (e.g. file name), file type, location of the file in memory, identity of creator of the file, date of file creation, and date of last file access. In some embodiments, file records may be accessed via a GUI for the file vault 190. For example, the GUI for the file vault 190 may display a listing of files and file records that are stored in the files database 192. Selecting an entry corresponding to a file may open the file or, in the case of a file record, display data that is contained in the file record.

Access to the file vault 190 and the data associated therewith may be controlled by a password. In particular, a master password may be required to gain access to the file vault 190, the files in the file repository 191, and the records of the files database 192. For example, the file vault 190 may present users with a prompt to enter a master password each time a request to access the file vault 190 is made. The features of the file vault 190 may become accessible upon correctly inputting the master password. A "master password" is intended to broadly encompass any type of authenticator that may be used for authentication and/or to gain access to the file vault 190. For example, a master password may be text-based, non-text-based, or a combination of both.

In some embodiments, the files database 192 may be stored locally in memory (e.g. flash memory 144) of the computing device 100. In particular, the file vault 190 may directly access the records of the files database 192 on the computing device 100. Alternatively, the files database 192 may be stored at and maintained by a remote service. For example, a remote server associated with the file vault 190 may be configured to maintain a plurality of file records. The file vault 190 can establish connections to the remote server in order to retrieve, add, delete, and/or update the file records stored remotely in the files database 192.

The file vault 190 enforces file security policies associated with protected files that are stored in file repository 191 and/or listed in the files database 192. Specifically, the file vault 190 grants access to the protected files of the file repository 191 and files database 192 only to the users that have access permissions for those files. The file vault 190 prohibits access by any other users of the computing device. In at least some embodiments, the file vault 190 may maintain a database of users that are authorized to access the protected files. An authorized user database 193 may indicate, for one or more of the protected files, users that have authorization to access the files. The authorized user database 193 may, in some embodiments, also indicate a level of authorization for each of the authorized users. For example, the authorized user database 193 may specify the files that a user is authorized to access and the file permissions granted to the user for each of those files. The authorized user database 193 may be updated, either manually or periodically, to add or delete users or to modify authorization levels for previously authorized users.

In at least some embodiments, the file vault 190 may be configured to directly handle opening the protected files of the file repository 191 and files database 192. That is, users may be able to open and access the content of the protected files from within the file vault 190. However, this option to open a file using the file vault 190 may not always be available. For example, some files may be of data types that are not supported by the built-in content navigators (e.g. viewer, editor, etc.) of the file vault 190.

In such cases, users may be presented with options to launch third-party applications 195 on the computing device 100 to access the files. As will be explained in greater detail below, the third-party applications 195 may be categorized as secured or unsecured, based on whether their behavior has been modified in accordance with the application security mechanism described in the present disclosure. A secured applications database 194 may be maintained by the file vault 190 for tracking the applications that are deemed, by the file vault 190, to be secure. Specifically, the secured applications database 194 may list the applications that adhere to the application security settings enforced by the file vault 190. In at least some embodiments, the file vault 190 may limit the applications which can be used for accessing the protected files to only those applications that are listed in the secured applications database 194. Authorized users can select a suitable one of the secured applications to access the content of protected files. For example, when attempting to open a file within the file vault 190, users may be presented with options to launch one or more of the secured applications that support the file type of the file. Unsecured applications may be prohibited from opening any protected file in the file repository 191 or files database 192. For example, protected files may not be accessible or visible from within an unsecured application.

Figure 2:
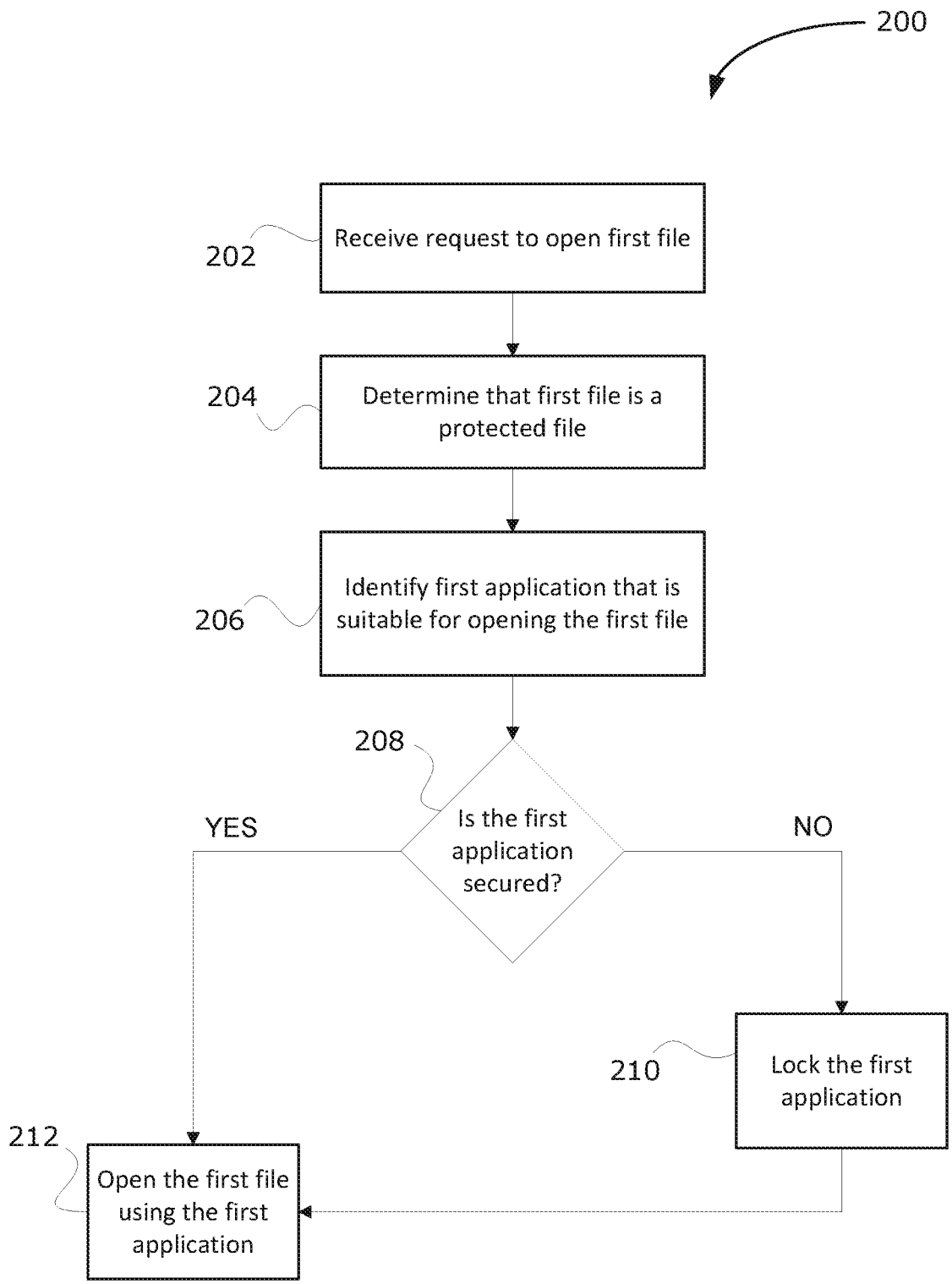
FIG. 2 shows, in flowchart form, an example method for managing access to protected file content, in accordance with an example embodiment.

Reference is now made to FIG. 2, which shows, in flowchart form, an example method 200 for managing access to protected file content on a computing device. The method 200 may be implemented by a computing device, such as the computing device 100 of FIG. 1. In particular, all or part of the method 200 may be performed by a file manager application residing on the computing device, such as the file vault 190 of FIG. 1. In some embodiments, the method 200 may be implemented by an applications manager which manages application settings and data for one or more applications on the computing device. More generally, the operations of method 200 may be performed by software or system utility that is configured to control application behavior and settings.

The method 200 relates to regulating user access of protected file content. In accordance with method 200, the behavior of third-party applications may be controlled in order to prevent unauthorized access of protected file content using said applications.

In operation 202, the computing device receives a request to open a first file stored on the computing device. The first file may, for example, be a protected file. The first file may have metadata indicating its status as a protected file or it may be contained in a database of known protected files, such as files database 192 of FIG. 1. The request may be received via a user input on the computing device. For example, a user selection of a user interface element, such as an icon, associated with the first file may be input. The selection of the first file may be made from within an application, such as a file vault, or from a folder containing a plurality of data files of the computing device.

In operation 204, the computing device determines that the first file is a protected file. In some embodiments, metadata associated with the first file may be checked to determine whether the file is protected. The file metadata may, for example, include a file type or status field for indicating if the file is a protected file. In some embodiments, the first file may be determined to be a protected file if it is associated with a file vault. Specifically, if the first file is managed using a file vault which limits access to managed files, the first file may be identified as a protected file. For example, the first file may be stored in a file repository associated with a file vault or it may be contained in a database of protected files maintained by a file vault.

If the first file is determined to be a protected file, the computing device identifies a first application that is suitable for opening the first file, in operation 206. The first application may be a file vault. For example, if the first file is stored in or managed using a file vault, the file vault may be used for opening the first file. In some embodiments, the file vault may be set as the default application for opening protected files that are managed using the file vault. Depending on the file type of the first file, a built-in content navigator, such as a viewer, editor, etc., of the file vault may be used to access the content of the first file.

The file vault may not always be suitable for opening a protected file. The first file may, for example, be of a file format that is not supported by the file vault. In particular, the file vault may not include a content navigator that is suitable for opening files having the file format of the first file. In response to determining that the file vault does not support opening the first file, the computing device may select an application that is different from the file vault as the first application in operation 206. For example, the computing device may check to identify a predefined default application for opening files having the file format of the first file. In some embodiments, the computing device may receive, via user input, a selection of the first application. That is, the first application may be identified by receiving a user selection of the application. For example, a user of the computing device may be presented with options for applications which support opening the first file and prompted to select one of the options. The options may be presented graphically on the computing device when a user requests to open the first file. For example, if the first file is stored in a file vault, a graphical user interface associated with the file vault may display options for applications which may be used to open the first file. The user-selected application may be the identified first application.

In operation 208, the computing device determines whether the first application is a secured application. A secured application is an application that is configured to prevent unauthorized access of the content (e.g. file data) of any protected files that are opened using the application. An application may be referred to as a secured application if the application prohibits access to cached file data associated with one or more files by users of the application that are not authorized to access the content of those files. A file vault on the computing device may allow only secured applications to be used for opening protected files. For any unsecured application that is requested to be used to open a protected file, a file vault may be configured to prevent such application from opening the file or control the behavior of the application to convert it to a secured application.

In at least some embodiments, an application may be determined to be secured if users are required to authenticate themselves when using the application. In particular, user authentication may be required when requesting to use a secured application to open a protected file. For example, users may be required to authenticate to the secured application itself or to a file vault managing the protected file that is requested to be accessed using the secured application. An application that does not cache file data for files opened using the application may also be deemed secured. The computing device may, for example, perform a check of an application's settings and determine that the application is secured if it is not configured to store caches containing file data that is accessed using the application.

Conversely, an application may be determined to be "unsecured" if it does not require user authentication for access. For example, an application which may be launched, without limit, by any user of the computing device is unsecured. An application which does not distinguish between requests to launch the application by authorized users and requests by unauthorized users may also be deemed unsecured. In particular, an application which does not restrict use of the application to only those users that are authorized to access file data cached by the application is unsecured.

The computing device may determine, in operation 208, that the first application is unsecured upon determining that the first application does not require user authentication. A secured application may have different levels of required user authentication. In some embodiments, a secured application may require that users be authenticated prior to launching the application. That is, a user may need to be authenticated in order to access any functionality of the application. In some other embodiments, users may only be required to authenticate themselves when requesting to access application cache data, such as cached file data for one or more previously accessed files. For example, if a user tries to access cached file data from within a secured application, the user may be prompted to enter their authentication credentials. Other functionalities of the application may not be limited to only authorized users. Thus, not all applications which require some form of user authentication can be considered "secured". In particular, the first application may be unsecured when the authentication required by the first application, if any, does not prevent unauthorized access of cached file data.

In some embodiments, an application which does not require user authentication may be determined to be unsecured only if the application satisfies one or more additional conditions. For example, an application may be unsecured if it does not restrict user access and if it caches file data for previously accessed files. As further examples, an application which does not implement access control may be unsecured if: the application has not been updated for a period of time exceeding a threshold duration; the application has been used to open at least one protected file; or the application does not provide a functionality for deleting or preventing access to cached file data.

In some embodiments, the computing device may query a database containing information associated with known secured applications, such as the secured applications database 194 of FIG. 1, to determine whether the first application is secured. If the first application is contained in such a database, it is determined to be secured. The database may be updated dynamically as previously unsecured applications are converted to secure applications and added to the database.

In response to determining that the first application is unsecured, the computing device locks the first application in operation 210. More specifically, the computing device switches the first application to a locked state for preventing unauthorized access of application data of the first application. In at least some embodiments, a file vault implementation may be configured to used to manage the locked status of various applications on the computing device. In particular, a file vault may cause an unsecured application to switch to a locked state. For example, if an application is unsecured and is used to open a protected file that is stored in a file vault, the file vault may cause the first application to be locked. An application is locked, or placed in a locked state, if all or parts of the application become inaccessible to unauthorized users. For example, an application may be locked by configuring the application's access settings such that user authentication is required to gain access to the application.

For applications that are secured or in a locked state, authorized users information is maintained. In some embodiments, a file vault (or another implementation, such as an applications manager) maintains a database of users that are authorized to access secured or locked applications. The list of authorized users for a secured/locked application may include, at least, those users that are authorized to access protected files that were previously opened using the application. A file vault may, for example, reference a database of users that have access permissions for one or more protected files to obtain authorized users information for the respective secured/locked applications. The authorized users information for an application may be updated on an ongoing basis as additional files are opened using the application. The list of authorized users may also include device owners, administrators, or other users having predefined access privileges for protected data on the computing device.

In operation 210, the computing device may cause the first application to implement a user authentication scheme. In some embodiments, the first application may be locked prior to opening the first file using the first application. That is, if the first application is unsecured, the user associated with the request received in operation 202 may need to be authenticated in order to use the first application for opening the first file. The user may authenticate to the first application or to a file vault containing the first file. Alternatively, the first application may be locked after processing the request received in operation 202. The computing device may verify that a requesting user associated with the request is authorized to access the first file and, upon successful verification, request the first application to open the first file prior to locking the first application. This allows the requesting user to open the first file using the first application while ensuring that any future users of the first application are required to authenticate themselves prior to use. By locking an unsecured application, access to cached data associated with files that are opened using the application may be limited to only those users having access permissions for the files.

In operation 212, the first file is opened using the first application. For example, a file vault may request the first application to open the first file. In at least some embodiments, a file vault prevents opening protected files using applications that are unsecured. In particular, the file vault may block an unsecured application from opening protected files. If an unsecured application is determined to be locked, the file vault may cease to block the application, and allow the application to be used to open protected files.

In at least some embodiments, users can access an application that is in a locked state to open one or more files. In particular, users can access a locked application by authenticating themselves, either to the application or to a file vault (or applications manager) implementation. While an application is in the locked state, the computing device may receive input of user credentials. Upon verifying that a user associated with the inputted credentials is permitted to access application data associated with the application, the computing device may grant, to the user, access to the application in the locked state. In particular, the user may be permitted to open a file using the locked application.

Figure 3:
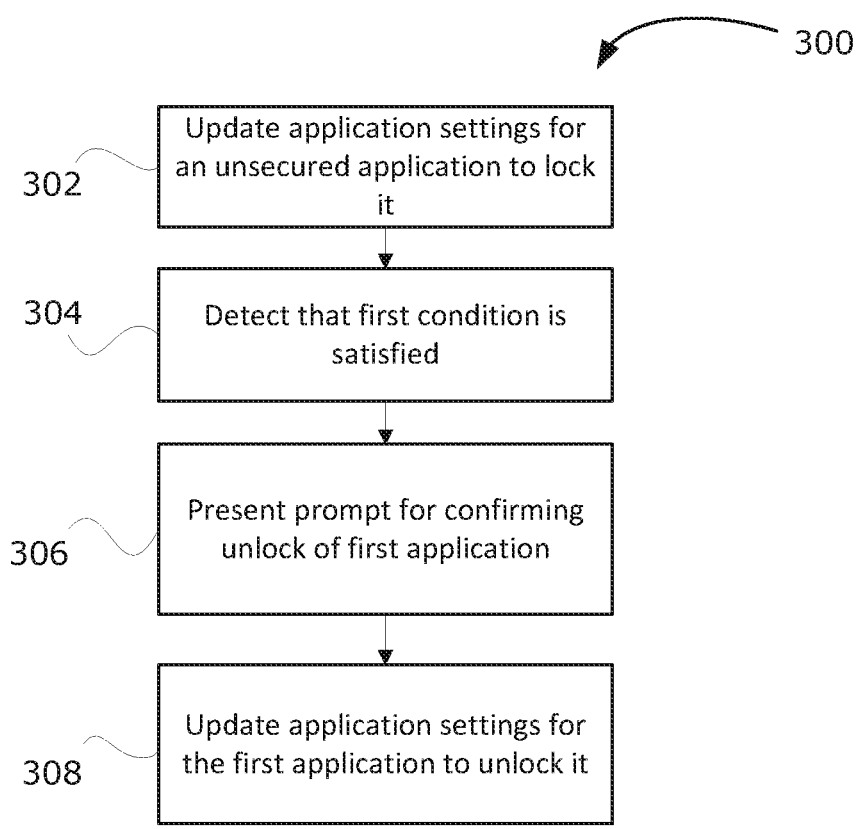
FIG. 3 shows, in flowchart form, an example method for updating security settings of an application, in accordance with an example embodiment.

Reference is now made to FIG. 3, which shows, in flowchart form, an example method 300 for updating security settings of an application. The method 300, in this example, may be implemented by a computing device, such as the computing device 100 of FIG. 1. In particular, all or part of the method 300 may be implemented by a file vault residing on the computing device, such as the file vault 190 of FIG. 1. In some embodiments, the method 300 may be implemented by an applications manager or similar implementations for managing the behavior of applications on the computing device.

The method 300 may be performed when an unsecured application is being locked. If an application is determined to be unsecured, the application may be locked prior to opening any protected files using the application. In operation 302, application settings for an unsecured application are updated to lock the application (i.e. switch the application to a locked state). For example, the application's access control settings may be modified to implement a user authentication scheme for the application. The user authentication scheme limits access to the unsecured application to only those users that are authorized to access the unsecured application and/or its application data, such as cached file data for previously opened files.

Once the unsecured application is locked, it remains in the locked state until a state change condition is detected. In operation 304, the computing device detects that a first predefined condition is satisfied. The predefined condition is associated with the locked state of the unsecured application. The unsecured application may be unlocked if any one of the following conditions is determined to be satisfied: detection of a device reset condition; detection that a predefined length of time has elapsed since the unsecured application was locked; cached file data for the unsecured application is clear or deleted; or receipt of request from an authorized user to switch the first application to the unlocked state. One or more of these conditions may serve as a trigger for unlocking the unsecured application.

In operation 306, a prompt may be displayed to a user of the computing device to confirm that the unsecured application is to be unlocked. The prompt may require a user to input their user credentials in order to demonstrate that they have proper authorization for confirming unlock of the unsecured application. If confirmation is received from an authorized user to unlock the unsecured application, the computing device updates application settings for the unsecured application to change the application to a locked state, in operation 308.

Figure 4:
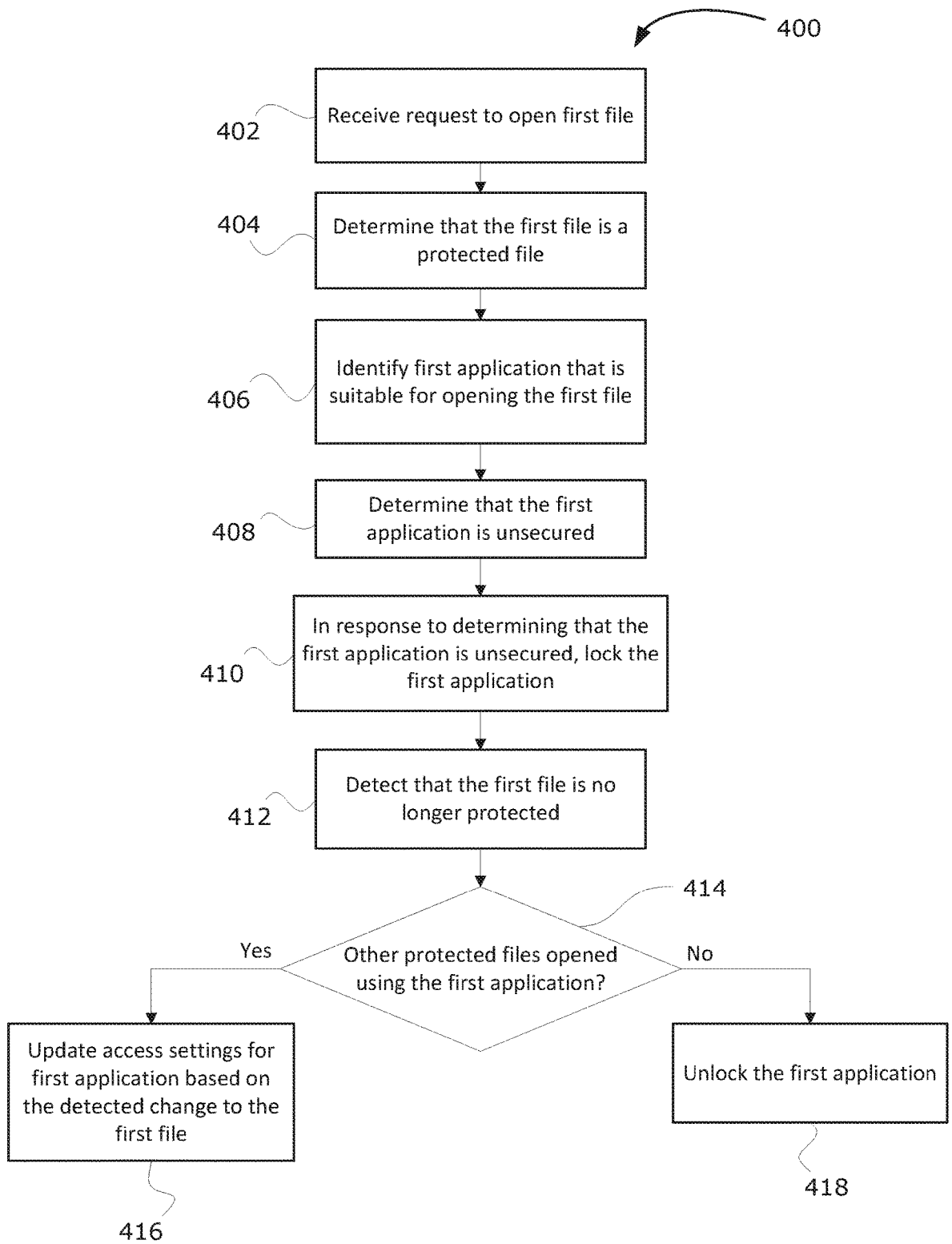
FIG. 4 shows, in flowchart form, an example method for managing access to protected file content, in accordance with another example embodiment.

Reference is now made to FIG. 4, which shows, in flowchart form, another example method 400 for managing access to protected file content. The method 400 may be implemented by a computing device, such as the computing device 100 of FIG. 1. For example, the method 400 may be performed, at least in part, by a file vault or an applications manager on a computing device.

Operations 402-410 correspond to operations 302-310 of method 300 in FIG. 3. A request to open a first file is received in operation 402. The computing device determines that the first file is a protected file in operation 404, and, in operation 406, identifies a first application that is suitable for opening the first file. If the identified first application is determined to be an unsecured application in operation 408, the computing device locks the first application in operation 410.

The locked or unlocked state of an application may be updated dynamically. In some embodiments, the computing device may change a lock state of an application based on file properties of files that were previously opened using the application. For example, a locked application may automatically be unlocked if it is determined that files that were accessed using the application have been deleted or are no longer associated with protected file status.

In operation 412, the computing device detects that the first file is no longer a protected file. For example, the file property of the first file may have been modified to remove the protected status. The computing device then determines whether other protected files were previously opened using the first application, in operation 414. If there were no such files, the first application can be unlocked. Otherwise, the access settings for the first application may be updated based on the detected change to the first file. In particular, a user authentication scheme for the first application may be updated to remove user authentication requirements that were previously associated with accessing the first file. For example, users that were authorized to access the first application by virtue of having access privilege for the first file may no longer enjoy the same access.

Example embodiments of the present application are not limited to any particular operating system, system architecture, computing device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of managing access to protected file content on a computing device, the method comprising:
   receiving a request to open a file stored on the computing device;
   determining that the file is a protected file stored in an access-restricted file vault;
   in response to determining that the file is a protected file stored in the access-restricted file vault:
      identifying a first application different from the file vault for use in opening the file;
      determining that the first application is an unsecured application; and
   in response to determining that the first application is an unsecured application, causing the first application to be locked prior to opening the file using the first application to prevent unauthorized access of cached file data for the file in a locked state of the first application;
   verifying that a requesting user associated with the request is authorized to access the file using the first application;
   in response to the verifying, requesting the first application to open the file;
   receiving input of user authentication data while the first application is in the locked state;
   verifying that a user associated with the inputted user authentication data is permitted to access application data associated with the first application; and
   in response to verifying that the user associated with the inputted user authentication data is permitted to access the application data, granting, to the user, access to the first application in the locked state for opening the file.

2. The method of claim 1, wherein determining that the first application is unsecured comprises determining that the application does not require user authentication for access.

3. The method of claim 1, wherein identifying the first application comprises determining that the first application supports opening files having a file format associated with the file.

4. The method of claim 1, wherein locking the first application comprises configuring access control settings for the first application such that user authentication is required to access the first application.

5. The method of claim 1, further comprising unlocking the first application to switch the first application from the locked state to an unlocked state in response to determining that a first predefined condition is satisfied, the first application being accessible to any user in the unlocked state.

6. The method of claim 5, wherein determining that the first predefined condition is satisfied comprises at least one of:
   detecting a device reset condition;
   detecting that a predefined length of time has elapsed since the first application was locked;
   determining that cached file data for the first application is deleted; or
   receiving a request from an authorized user to switch the first application to the unlocked state.

7. A computing device, comprising:
   an input interface;
   memory;
   a processor coupled with the input interface and the memory, the processor being configured to:
     receive a request to open a file stored on the computing device;
     determine that the file is a protected file stored in an access-restricted file vault;
     in response to determining that the file is a protected file stored in an access-restricted file vault:
     identify a first application different from the file vault for use in opening the file;
     determine that the first application is an unsecured application; and
     in response to determining that the first application is an unsecured application, cause the first application to be locked prior to opening the file using the first application to prevent unauthorized access of cached file data for the file in a locked state of the first application;
     verify that a requesting user associated with the request is authorized to access the file using the first application;
     in response to the verifying, request the first application to open the file;
     receive input of user authentication data while the first application is in the locked state;
     verify that a user associated with the inputted user authentication data is permitted to access application data associated with the first application; and
     in response to verifying that the user associated with the inputted user authentication data is permitted to access the application data, grant, to the user, access to the first application in the locked state for opening the file.

8. The computing device of claim 7, wherein determining that the first application is unsecured comprises determining that the first application does not require user authentication for access.

9. The computing device of claim 7, wherein identifying the first application comprises determining that the first application supports opening files having a file format associated with the file.

10. The computing device of claim 7, wherein locking the first application comprises configuring access control settings for the first application such that user authentication is required to access the first application.

11. The computing device of claim 7, wherein the processor is further configured to unlock the first application to switch the first application from the locked state to an unlocked state in response to determining that a first predefined condition is satisfied, the first application being accessible to any user in the unlocked state.

12. The computing device of claim 11, wherein determining that the first predefined condition is satisfied comprises at least one of:
   detecting a device reset condition;
   detecting that a predefined length of time has elapsed since the first application was locked;
   determining that cached file data for the first application is deleted; or
   receiving a request from an authorized user to switch the first application to the unlocked state.

* * * * *